United States Patent
Sawa et al.

(10) Patent No.: US 10,597,050 B2
(45) Date of Patent: Mar. 24, 2020

(54) AIR SPRING AND BOGIE

(71) Applicants: Sumitomo Electric Industries, Ltd., Osaka-shi, Osaka (JP); KAWASAKI JUKOGYO KABUSHIKI KAISHA, Kobe-shi, Hyogo (JP)

(72) Inventors: Takayuki Sawa, Osaka (JP); Hideki Kitada, Osaka (JP); Yasuhiko Ura, Osaka (JP); Takehiro Nishimura, Kobe (JP); Keiichiro Kamura, Kobe (JP); Yoshi Sato, Sanda (JP)

(73) Assignees: Sumitomo Electric Industries, Ltd., Osaka-shi, Osaka (JP); KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 156 days.

(21) Appl. No.: 15/528,551

(22) PCT Filed: Oct. 17, 2016

(86) PCT No.: PCT/JP2016/080698
§ 371 (c)(1),
(2) Date: May 22, 2017

(87) PCT Pub. No.: WO2018/073863
PCT Pub. Date: Apr. 26, 2018

(65) Prior Publication Data
US 2019/0084594 A1    Mar. 21, 2019

(51) Int. Cl.
*F16F 9/04* (2006.01)
*B61F 5/10* (2006.01)
(Continued)

(52) U.S. Cl.
CPC .................. *B61F 5/10* (2013.01); *F16F 9/05* (2013.01); *F16F 9/052* (2013.01); *F16F 9/44* (2013.01)

(58) Field of Classification Search
CPC ...... F16F 9/04; F16F 9/05; F16F 9/052; B61F 5/10; B60G 11/27
(Continued)

(56) References Cited

U.S. PATENT DOCUMENTS 4,721,292 A * 1/1988 Saito ..................... F16F 13/105
                                                       180/312
6,257,561 B1    7/2001 Nakayama et al.
(Continued)

FOREIGN PATENT DOCUMENTS

JP    2000-035075 A    2/2000
JP    2011-245937 A    12/2011
(Continued)

*Primary Examiner* — Christopher P Schwartz
(74) *Attorney, Agent, or Firm* — Faegre Drinker Biddle & Reath LLP (57) ABSTRACT

An air spring includes an outer cylindrical member, an inner cylindrical member combined with the outer cylindrical member, a diaphragm coupling the outer cylindrical member and the inner cylindrical member to each other, the diaphragm providing an internal space between the outer cylindrical member and the inner cylindrical member, a first element located on a side of the internal space in at least one of the outer cylindrical member and the inner cylindrical member and defining a part of the internal space, a second element adjacent to the first element, the second element defining a part of the internal space, and a cover layer covering a boundary portion between the first element and the second element.

13 Claims, 6 Drawing Sheets (51) Int. Cl.
*F16F 9/05* (2006.01)
*F16F 9/44* (2006.01)

(58) Field of Classification Search
USPC .......................................... 267/64.19–64.27
See application file for complete search history.

(56) References Cited

U.S. PATENT DOCUMENTS

| 8,540,220 | B2* | 9/2013 | Sawa | ........................ | B61F 5/10 |
| | | | | | 267/3 |
| 10,087,628 | B2* | 10/2018 | Shuhaibar | ............... | E04C 3/293 |
| 2013/0313764 | A1 | 11/2013 | Fujimoto et al. | | |
| 2014/0300038 | A1* | 10/2014 | Kita | ........................ | F16F 9/05 |
| | | | | | 267/122 |

FOREIGN PATENT DOCUMENTS

| JP | 2012-17768 A | 1/2012 |
| JP | 2012-17769 A | 1/2012 |
| JP | 2012-145135 A | 8/2012 |
| WO | WO-2014/194008 A1 | 12/2014 |

* cited by examiner

AIR SPRING AND BOGIE

TECHNICAL FIELD

The present invention relates to an air spring and a bogie.

BACKGROUND ART

An air spring making use of elasticity of compressed air has conventionally been known. For example, Japanese Patent Laying-Open No. 2000-035075 describes one example of a conventional air spring. The air spring described in this document has a stopper 8 provided in an inner cylindrical member 4 and having a protrusion 8b and first and second surfaces 6a and 6b provided in an outer cylindrical member 6 in correspondence with protrusion 8b.

Japanese Patent Laying-Open No. 2012-017769 also describes another example of a conventional air spring. The air spring described in this publication has an upper stop member 5 made of rubber and provided on an outer cylindrical member 1 and a lower stop member 12 provided on an inner cylindrical member 2. Japanese Patent Laying-Open No. 2012-145135 describes yet another example of a conventional air spring. This air spring has an upper stopper 12 made of rubber and provided on an upper member 3 and a lower stopper 16 provided in a lower member 4.

CITATION LIST

Patent Document

PTD 1: Japanese Patent Laying-Open No. 2000-035075
PTD 2: Japanese Patent Laying-Open No. 2012-017769
PTD 3: Japanese Patent Laying-Open No. 2012-145135

SUMMARY OF INVENTION

An air spring according to the present invention includes a cover layer covering a boundary portion between elements in the air spring. The "boundary portion" in the specification of the present application encompasses various manners such as a joint portion where elements are joined to each other by welding, adhesion or the like, a portion of contact (including also partial contact) and a gap portion between elements when elements are directly or indirectly fixed to each other, as well as a portion of contact (including also partial contact) and a gap portion between adjacent elements.

An air spring according to one manner of the present invention includes an outer cylindrical member, an inner cylindrical member combined with the outer cylindrical member, and a diaphragm coupling the outer cylindrical member and the inner cylindrical member to each other, the diaphragm providing an internal space between the outer cylindrical member and the inner cylindrical member. The air spring includes a first element located on a side of the internal space in at least one of the outer cylindrical member and the inner cylindrical member and defining a part of the internal space, a second element adjacent to the first element, the second element defining a part of the internal space, and a cover layer covering a boundary portion between the first element and the second element. "Defining a part of the internal space" in the specification of the present application encompasses not only an example in which an element is exposed in the internal space and directly defines a part of the internal space but also an example in which an element extends along the internal space and indirectly defines a part of the internal space together with another element. Being "adjacent" encompasses such examples as adjacent two elements being in contact with each other, partially in contact with each other, and proximate to each other without contact.

DESCRIPTION OF EMBODIMENTS

Problems to be Solved by the Present Disclosure

An air spring in an embodiment of the present invention will be explained below with reference to FIGS. 1 to 7. Firstly, problems of the air springs in PTD 1 (Japanese Patent Laying-Open No. 2000-035075), PTD 2 (Japanese Patent Laying-Open No. 2012-017769), and PTD 3 (Japanese Patent Laying-Open No. 2012-145135) described above will be explained.

The air spring described in PTD 1 will initially be explained. In this air spring, a boundary portion between a first surface (6a) and a second surface (6b) is exposed in an internal space in the air spring. Therefore, when such a defect as damage occurs in this boundary portion, the defect directly affects the internal space in the air spring (for example, leakage of air at a seal ring portion or clogging of a pipe due to powders resulting from wear).

Figure 3:
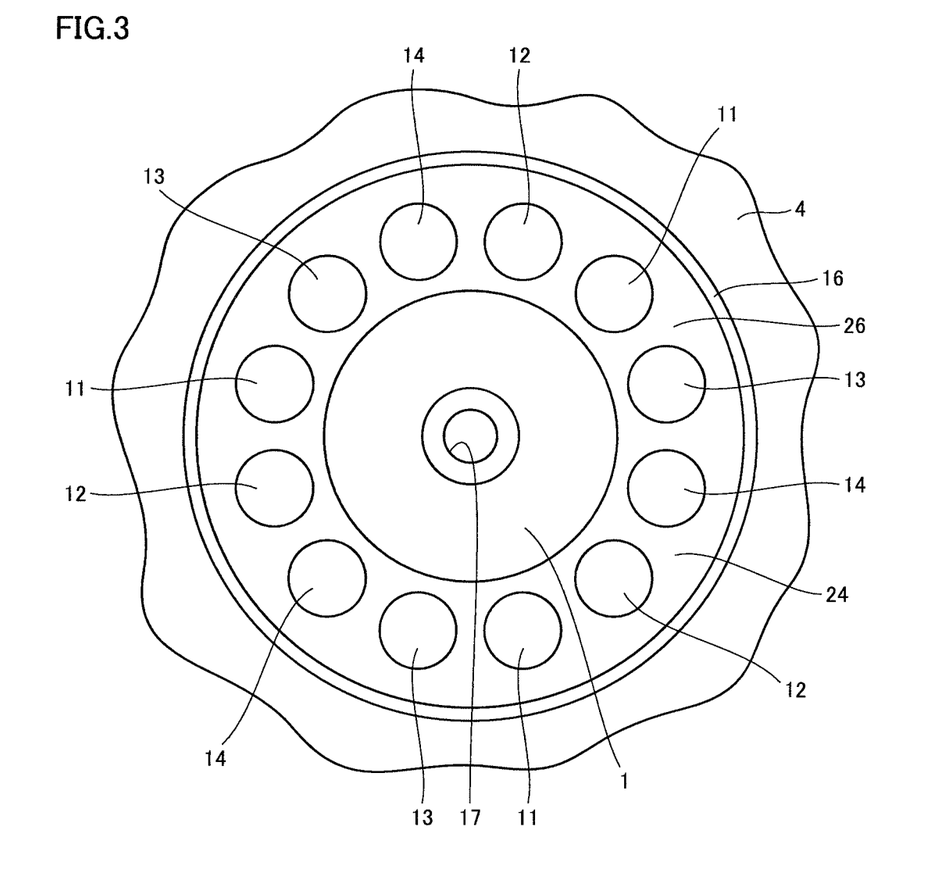
FIG. 3 is a partial plan view showing an internal structure of an outer cylindrical member shown in FIG. 1.

In the air spring (A) described in PTD 2 as well, in the example shown in FIG. 3, a boundary portion between an upper stop member 5 and a main body (1A) is exposed in an internal space in the air spring (A). Therefore, as in PTD 1, when such a defect as damage occurs in the boundary portion, the defect directly affects the internal space in the air spring.

In an air spring (1) described in PTD 3 as well, a boundary portion between an upper face plate (9) and an upper stopper (12) is exposed in an internal space in the air spring (1). Therefore, when such a defect as a damage occurs in the boundary portion as in PTDs 1 and 2, the defect directly affects the internal space in the air spring.

Effects of the Present Disclosure

The air spring in the present embodiment can solve the problems of the air springs described in PTDs 1 to 3 as above. The air spring in the present embodiment includes a cover layer covering a boundary portion between elements defining a part of an internal space. Therefore, even when some kind of a defect such as a damage occurs in the boundary portion, such a defect can be prevented from directly affecting the internal space.

DESCRIPTION OF EMBODIMENTS OF THE INVENTION OF THE PRESENT APPLICATION

Summary of embodiments according to the invention of the present application will initially be listed and described.

(1) An air spring according to one manner of the present invention includes an outer cylindrical member, an inner cylindrical member combined with the outer cylindrical member, and a diaphragm coupling the outer cylindrical member and the inner cylindrical member to each other and providing an internal space between the outer cylindrical member and the inner cylindrical member. The air spring includes a first element and a second element in the internal space. The first element is located on a side of the internal space in at least one of the outer cylindrical member and the inner cylindrical member and defines a part of the internal space. The second element is adjacent to the first element and defines a part of the internal space. The air spring includes a cover layer covering a boundary portion between the first element and the second element.

(2) In the air spring according to (1), at least one of the outer cylindrical member and the inner cylindrical member may include an inner surface located on the side of the internal space and a joint member joined to the inner surface. In this case, the first element may include the inner surface, the second element may include the joint member, and the boundary portion may include a joint portion between the joint member and the inner surface.

(3) In the air spring according to (1), at least one of the outer cylindrical member and the inner cylindrical member may include an inner surface located on the side of the internal space and a protrusion portion joined to the inner surface and having an internal chamber. In this case, the first element may include the inner surface, the second element may include the protrusion portion, and the boundary portion may include a joint portion between the protrusion portion and the inner surface.

(4) In the air spring according to (3), the protrusion portion may have a sidewall member joined to the inner surface and a cover plate joined to the sidewall member. A plurality of the joint portions may be provided. The plurality of joint portions may include a first joint portion between the sidewall member and the inner surface and a second joint portion between the sidewall member and the cover plate. In this case, the cover layer extends at least from the first joint portion to the second joint portion.

(5) in the air spring according to (4), the cover layer located on the sidewall member may be equal in thickness to or greater in thickness than the cover layer located on the cover plate.

(6) In the air spring according to (4), the cover layer located on the cover plate may be greater in thickness than the cover layer located on the sidewall member.

(7) In the air spring according to (1), the outer cylindrical member may have a reception portion joined to an inner surface of the outer cylindrical member and receiving one end of the diaphragm and a protrusion portion joined to the inner surface of the outer cylindrical member at a distance from the reception portion, the protrusion portion being capable of restricting displacement of the outer cylindrical member. In this case, the first element may include the inner surface of the outer cylindrical member, the second element may include the reception portion and the protrusion portion, and the cover layer may extend at least from a joint portion between the reception portion and the inner surface of the outer cylindrical member to a joint portion between the inner surface of the outer cylindrical member and the protrusion portion.

(8) In the air spring according to (2) to (8), the cover layer may extend to a portion between the reception portion and one end of the diaphragm.

(9) In the air spring according to (2) to (8), the joint portion may include a welded portion.

(10) In the air spring according to (1), at least one of the outer cylindrical member and the inner cylindrical member may include an inner surface located on the side of the internal space and an adjacent member adjacent to the inner surface. In this case, the first element may include the inner surface, the second element may include the adjacent member, and the boundary portion may include a boundary portion between the inner surface and the adjacent member.

(11) In the air spring according to (1) to (10), the cover layer may include a first portion having a first thickness on the boundary portion and a second portion having a second thickness smaller than the first thickness on a portion other than the boundary portion.

(12) In the air spring according to (1) to (11), the cover layer may be composed of at least one material selected from the group consisting of a resin, rubber, plastics, and elastomer.

(13) In the air spring according to (1) to (12), the diaphragm and the cover layer may be composed of materials different from each other.

(14) In the air spring according to (1) to (13), the cover layer may be different in mechanical characteristics from the diaphragm.

(15) A bogie according to one manner of the present disclosure includes the air spring according to (1) to (14).

DETAILS OF EMBODIMENTS OF THE INVENTION OF THE PRESENT APPLICATION

Details of the embodiments of the invention of the present application will now be described. The air spring in the present embodiment can be used in various applications such as a suspension, a vibration isolator, and a vehicle height controller. When the air spring is employed, for example, in railway vehicles, it is attached between a vehicle and a bogie unit (a bogie and wheels) and vibration transmitted from the wheels to the vehicle can be mitigated.

The air spring in the present embodiment is a self-sealing air spring, and includes an outer cylindrical member, an inner cylindrical member, and a diaphragm. The outer cylindrical member is substantially cylindrical and has a circular upper plate and an annular circumferential wall portion rising from a circumferential edge portion of the upper plate. The inner cylindrical member is combined with the outer cylindrical member and substantially cylindrical. The inner cylindrical member is arranged inside the circumferential wall portion of the outer cylindrical member and has a circular lower plate and an annular wall portion rising from the lower plate. The outer cylindrical member and the inner cylindrical member can be made of a rigid material such as a metal or fiberglass reinforced plastics. The diaphragm couples the outer cylindrical member and the inner cylindrical member to each other and provides an internal space between the outer cylindrical member and the inner cylindrical member. The diaphragm has one end abutting on a part of the outer cylindrical member (for example, a reception portion erected on the upper plate of the outer cylindrical member) and has the other end abutting on a part of the inner cylindrical member (for example, the wall portion erected on the lower plate of the inner cylindrical member). The diaphragm can be made of a deformable material, for example, an elastic material such as rubber and elastomer. The internal space in the air spring is hermetically sealed and pressurized air is sealed in the internal space.

The air spring in the present embodiment also includes a stopper assembly arranged in the internal space as being pivotable over the inner cylindrical member, the stopper assembly allowing suppression of movement of the outer cylindrical member toward the inner cylindrical member more than necessary, and a pivoting mechanism pivoting the stopper assembly over the inner cylindrical member. The stopper assembly may be driven manually or with motive power from a motive power source.

Various elements including the stopper assembly described above are arranged in the internal space in the air spring in the present embodiment. Some of these elements directly or indirectly define a part of the internal space in the air spring. In the present embodiment, a cover layer is formed on a boundary portion between adjacent elements. Various materials are applicable as materials for the cover layer and an elastically deformable material can be adopted. Specifically, the cover layer can be made, for example, of a single layer of a resin, rubber, plastics, or elastomer or a layered structure based on combination of these. A formable material is preferably selected as a material for the cover layer. The cover layer can thus readily be formed.

First Embodiment

Figure 1:
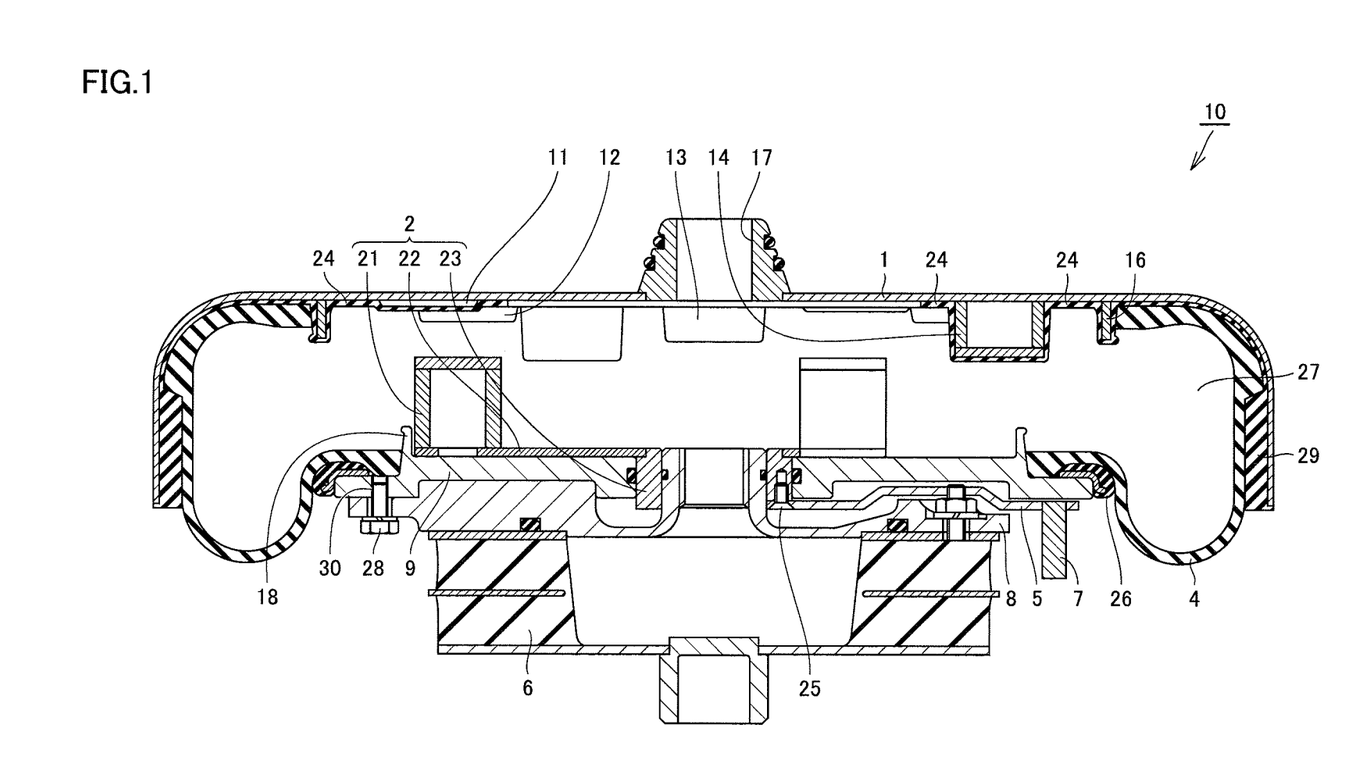
FIG. 1 is a cross-sectional view of an air spring in a first embodiment of the present invention.

A first embodiment of the present invention will be described with reference to FIGS. 1 to 5. FIG. 1 is a cross-sectional view of an air spring in the present first embodiment. As shown in FIG. 1, an air spring 10 includes an outer cylindrical member 1, an inner cylindrical member 9, and a diaphragm 4. Outer cylindrical member 1, diaphragm 4, and inner cylindrical member 9 define a substantially hermetically sealed internal space 27 in air spring 10.

Outer cylindrical member 1 has an upper plate in a central portion and a sidewall portion in a circumferential edge portion. The upper plate includes a plurality of protrusion portions 11 to 14 protruding from the upper plate and a ring-shaped projection portion 16 rising from the upper plate and located outside protrusion portions 11 to 14. Ring-shaped projection portion 16 is annular and has a function as a reception portion receiving one end of the diaphragm. A hole portion is provided in a central portion of the upper plate and a coupling portion 17 is attached to the hole portion. A ring guide 29 is formed between the sidewall portion and diaphragm 4. Protrusion portions 11 to 14 are cylindrical and are different in height from one another as shown in FIG. 1. Protrusion portions 11 to 14 may be hollow or solid. Some of protrusion portions 11 to 14 may be hollow and the remainder may be solid.

In the present first embodiment, a cover layer 24 is provided to cover a boundary portion between protrusion portions 11 to 14 and the upper plate and a boundary portion between ring-shaped projection portion 16 and the upper plate. Thus, even when some kind of a defect occurs in the boundary portion, the defect can be prevented from directly affecting internal space 27. For example, when cover layer 24 covers a boundary portion between elements made of a metal, a damage which may occur in the boundary portion for some factor can be suppressed from compromising hermeticity of the boundary portion and from diffusing metal powders in internal space 27.

Rubber is adopted as a material for cover layer 24 in the present first embodiment. Cover layer 24 may be formed from a single layer or a plurality of layers. Cover layer 24 can also be composed of a material the same or the same in type as a material for diaphragm 4, or may be composed of a material different from a material for diaphragm 4. For example, cover layer 24 may be different in mechanical characteristics such as hardness from diaphragm 4. Thus, adhesiveness between cover layer 24 and diaphragm 4 or a degree of wear thereof when they are brought in contact with each other can also appropriately be adjusted while functions of cover layer 24 itself are maintained.

As shown in FIG. 1, inner cylindrical member 9 includes a hole portion in a central portion, a lower plate having an upper surface portion around the hole portion, a flange portion 18 rising from the lower plate, and a stopper assembly 2 arranged on the upper surface portion of the lower plate. Stopper assembly 2 has a plurality of stopper portions 21 in a cylindrical shape, a base portion 22 where stopper portion 21 is placed, and a ring portion 23 attached by insertion in the hole portion in the central portion of the lower plate. Stopper portion 21 has a displacement restriction function to suppress movement of outer cylindrical member 1 toward inner cylindrical member 9 by a prescribed amount or more.

As shown in FIG. 1, diaphragm 4 couples outer cylindrical member 1 and inner cylindrical member 9 to each other and provides internal space 27 described above therebetween. Rubber is adopted also for a material for diaphragm 4 in the present first embodiment. A portion of diaphragm 4 on one end side extends along the sidewall portion of outer cylindrical member 1 and the upper plate. One end of diaphragm 4 abuts on cover layer 24 covering ring-shaped projection portion 16 of outer cylindrical member 1. A portion of diaphragm 4 on the other end side is positioned on a circumferential edge portion of inner cylindrical member 9. The other end of diaphragm 4 abuts on flange portion 18 of inner cylindrical member 9.

As shown in FIG. 1, cover layer 24 is formed between ring-shaped projection portion 16 and diaphragm 4 in the present first embodiment. By appropriately selecting a material for diaphragm 4 and cover layer 24, good adhesiveness between diaphragm 4 and cover layer 24 as described above can be obtained. In the example in FIG. 1, cover layer 24 extends between ring-shaped projection portion 16 and diaphragm 4, further extends onto the sidewall portion of outer cylindrical member 1, and reaches ring guide 29. A rubber seat 26 is arranged between diaphragm 4 and the circumferential edge portion of inner cylindrical member 9.

A bottom plate 8 is arranged under inner cylindrical member 9. Bottom plate 8 has a cylindrical portion in its central portion and the cylindrical portion is attached by insertion in ring portion 23 of stopper assembly 2. A screw hole 30 is provided in inner cylindrical member 9, and bottom plate 8 can be fixed to inner cylindrical member 9 by screwing a bolt 28 inserted through bottom plate 8 into screw hole 30. A lever 5 for pivotally operating stopper assembly 2 is disposed between inner cylindrical member 9 and bottom plate 8. One end of lever 5 is fixed to ring portion 23 by a screw 25. A handle 7 is attached to the other end of lever 5 such that lever 5 can pivotally be operated with a hand. Laminated rubber 6 is arranged under bottom plate 8.

Figure 2:
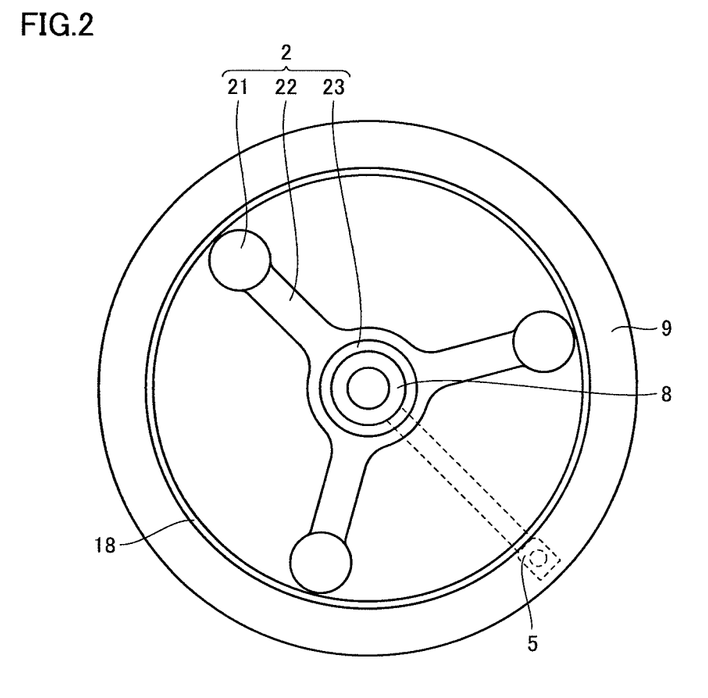
FIG. 2 is a plan view showing a stopper assembly and an inner cylindrical member shown in FIG. 1.

FIG. 2 shows an exemplary internal structure of inner cylindrical member 9. As shown in FIG. 2, stopper assembly 2 includes three base portions 22 and stopper portion 21 is fixed onto an outer end portion of each base portion 22. Three base portions 22 are simultaneously pivoted by pivotally operating lever 5 and accordingly three stopper portions 21 are also simultaneously pivoted.

Figure 4:
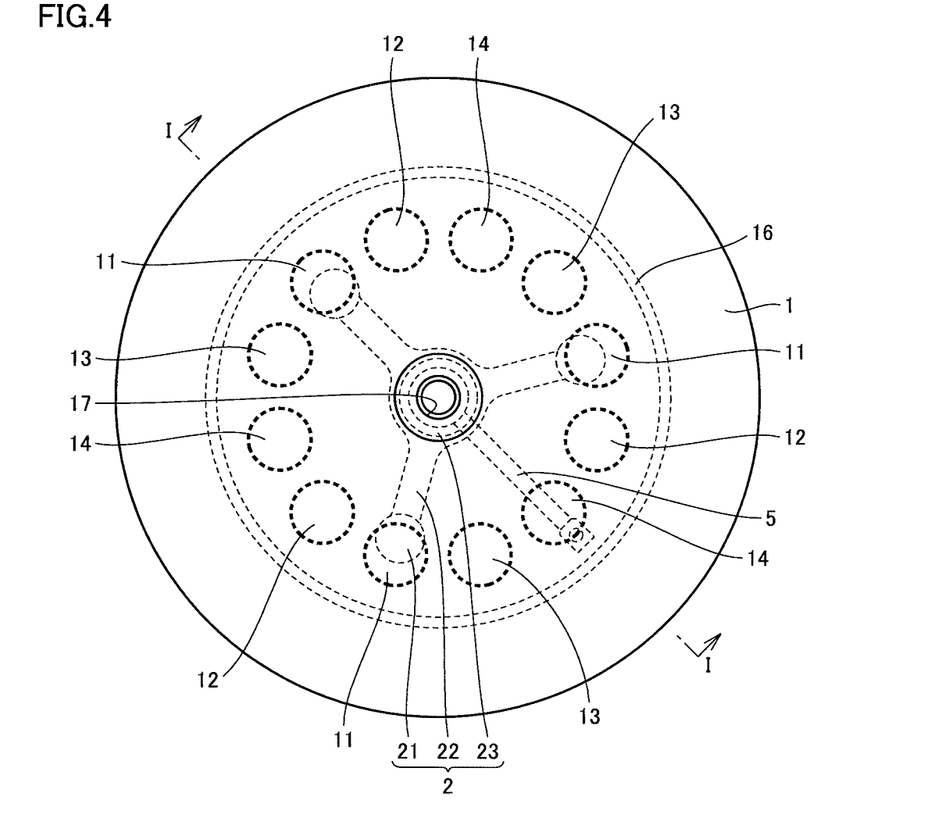
FIG. 4 is an illustrative diagram for illustrating an operation of the stopper assembly shown in FIG. 1.

FIG. 3 shows an exemplary internal structure of outer cylindrical member 1. As shown in FIG. 3, cover layer 24 reaches ring-shaped projection portion 16 continuously from a portion between outer cylindrical member 1 and diaphragm 4, covers ring-shaped projection portion 16, further covers protrusion portions 11 to 14, and reaches the central portion of the upper plate of outer cylindrical member 1. A projecting and recessed structure of the inner surface of the upper plate of outer cylindrical member 1 is covered with integrated cover layer 24. As shown in FIG. 3, protrusion portions 11 to 14 at four heights are arranged at an equal interval. In the example in FIG. 3, three sets of four types of protrusion portions 11 to 14 different in height from one another are provided. As shown in FIG. 4, three protrusion portions 11 equal in height are arranged at positions corresponding to three stopper portions 21. Protrusion portions 12 to 14 are also similarly arranged. Thus, three stopper portions 21 can simultaneously be arranged at positions opposed to three protrusion portions 11 at the same height by pivoting three stopper portions 21.

Figure 5:
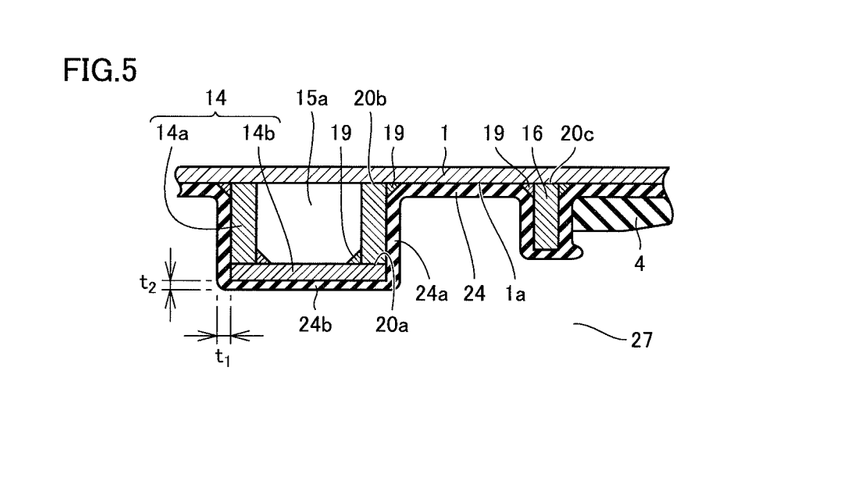
FIG. 5 is an enlarged cross-sectional view of a protrusion portion and the vicinity thereof in the air spring shown in FIG. 1.

FIG. 5 shows an enlarged view of protrusion portion 14 and ring-shaped projection portion 16 and the vicinity thereof. As shown in FIG. 5, ring-shaped projection portion 16 is joined to an inner surface 1a of outer cylindrical member 1 located on a side of internal space 27. Ring-shaped projection portion 16 is joined to inner surface 1a with a welded portion 19 being interposed. Welded portion 19 is formed in a boundary portion 20c between inner surface 1a and ring-shaped projection portion 16 and cover layer 24 covers welded portion 19. Thus, welded portion 19 can be protected, and even when some kind of a defect occurs in welded portion 19, such a defect can be prevented from affecting internal space 27. Diffusion of metal powders from welded portion 19 to internal space 27 can also be suppressed.

As shown in FIG. 5, protrusion portion 14 has a hollow structure. Protrusion portion 14 has a sidewall member 14a and a cover plate 14b covering an upper end portion of sidewall member 14a. Sidewall member 14a has a lower end joined to inner surface 1a of outer cylindrical member 1 with welded portion 19 being interposed and has an upper end joined to cover plate 14b with welded portion 19 being interposed. An internal chamber 15a is defined in protrusion portion 14 by sidewall member 14a and cover plate 14b. By covering protrusion portion 14 with cover layer 24, cover layer 24 can cover a boundary portion 20a between sidewall member 14a and cover plate 14b and a boundary portion 20b between sidewall member 14a and inner surface 1a. Thus, leakage of pressurized air in internal space 27 to the inside of internal chamber 15a through boundary portions 20a and 20b can be suppressed and hermeticity of internal space 27 can be improved. In particular, by continuously forming cover layer 24 from a portion under diaphragm 4 to a flat region in the central portion of the upper plate of outer cylindrical member 1, hermeticity of internal space 27 can effectively be improved.

As shown in FIG. 5, cover layer 24 has a sidewall portion 24a covering sidewall member 14a of protrusion portion 14 and an upper surface portion 24b covering cover plate 14b. A thickness t1 of sidewall portion 24a may be the same as or different from a thickness t2 of upper surface portion 24b. When thickness t1 of sidewall portion 24a is equal to or greater than thickness t2 of upper surface portion 24b, a portion of joint between sidewall member 14a and inner surface 1a of outer cylindrical member 1 and a portion of joint between sidewall member 14a and cover plate 14b can reliably be covered with cover layer 24. When thickness t2 of upper surface portion 24b is greater than thickness t1 of sidewall portion 24a, damage to protrusion portion 14 and stopper portion 21 of inner cylindrical member 9 when they come in contact with each other can effectively be mitigated.

Second Embodiment

Figure 6:
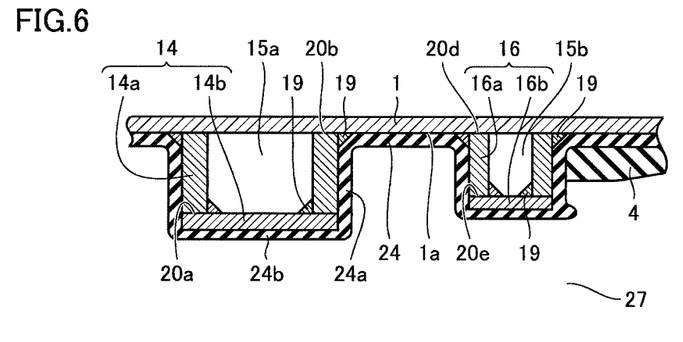
FIG. 6 is a partial cross-sectional view of the air spring in a second embodiment of the present invention.

A second embodiment of the present invention will now be described with reference to FIG. 6. FIG. 6 is a cross-sectional view showing a part of the air spring in the present second embodiment. As shown in FIG. 6, ring-shaped projection portion 16 has a hollow structure in the present second embodiment. The construction of this embodiment is otherwise the same as in the first embodiment.

As shown in FIG. 6, ring-shaped projection portion 16 has a sidewall member 16a and a cover plate 16b covering an upper end portion of sidewall member 16a. Sidewall portion 16a has a lower end joined to inner surface 1a of outer cylindrical member 1 with welded portion 19 being interposed and an upper end joined to cover plate 16b with welded portion 19 being interposed. Sidewall member 16a and cover plate 16b define an internal chamber 15b in ring-shaped projection portion 16.

As shown in FIG. 6, cover layer 24 covers both of ring-shaped projection portion 16 having a hollow structure and protrusion portion 14 having a hollow structure. In the present second embodiment, cover layer 24 covers a plurality of hollow structures. Cover layer 24 extends at least from a portion between the upper plate of outer cylindrical member 1 and diaphragm 4 to a portion between sidewall member 16a of ring-shaped projection portion 16 and diaphragm 4, covers ring-shaped projection portion 16, extends over inner surface 1a of outer cylindrical member 1, reaches sidewall member 14a of protrusion portion 14, further covers protrusion portion 14, and extends again over inner surface 1a of outer cylindrical member 1. In the present second embodiment as well, cover layer 24 can cover boundary portions 20a and 20b of protrusion portion 14 and boundary portions 20d and 20e of ring-shaped projection portion 16 and an effect the same as in the first embodiment can be expected.

Third Embodiment

Figure 7:
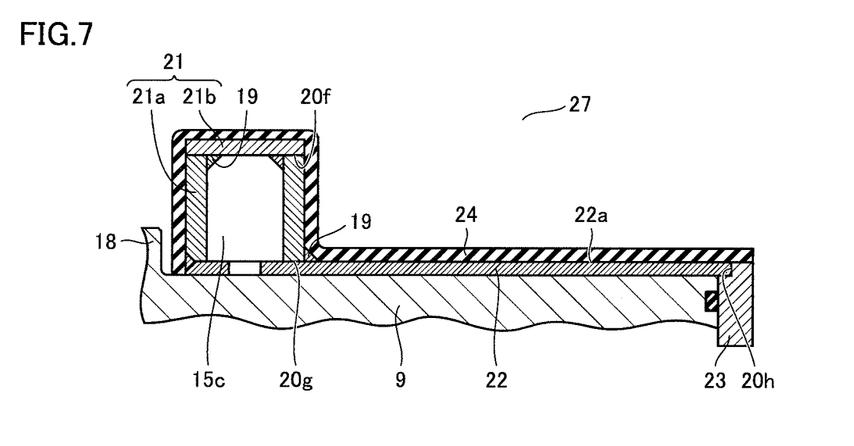
FIG. 7 is a partial cross-sectional view of the air spring in a third embodiment of the present invention.

A third embodiment of the present invention will now be described with reference to FIG. 7. FIG. 7 is a cross-sectional view showing a part of the air spring in the present third embodiment. As shown in FIG. 7, in the present third embodiment, cover layer 24 is formed on a side of inner cylindrical member 9. Though cover layer 24 may be formed only on the side of inner cylindrical member 9, cover layer 24 may be formed on the side of inner cylindrical member 9 and outer cylindrical member 1. The construction of this embodiment is otherwise the same as in the first embodiment.

As shown in FIG. 7, stopper portion 21 has a sidewall member 21a and a cover plate 21b covering an upper end of sidewall member 21a. Sidewall member 21a has a lower end joined to an inner surface 22a of base portion 22 in stopper assembly 2 with welded portion 19 being interposed. Inner surface 22a of base portion 22 corresponds to an inner surface located on the side of internal space 27 in inner cylindrical member 9. Sidewall member 21a has an upper end joined to cover plate 21b with welded portion 19 being interposed. Sidewall member 21a and cover plate 21b define an internal chamber 15c in stopper portion 21. In the present third embodiment, cover layer 24 covers a surface of stopper portion 21 and extends over inner surface 22a of base portion 22. Thus, cover layer 24 can cover boundary portions 20f and 20g of stopper portion 21 and an effect the same as in the first embodiment can be expected.

In the present third embodiment, cover layer 24 covers also a boundary portion 20h between ring portion 23 and base portion 22 in stopper assembly 2. Cover layer 24 covers also boundary portion 20h between the inner surface of inner cylindrical member 9 and ring portion 23 which is an adjacent member adjacent to the inner surface. Thus, when some kind of a defect occurs in boundary portion 20h, the defect can be prevented from affecting internal space 27.

A construction of a bogie according to an embodiment of the present invention will be described below.

Figure 8:
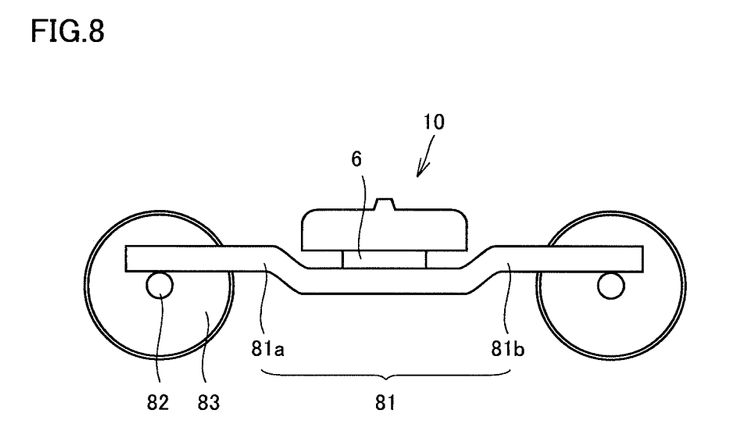
FIG. 8 is a side view of a bogie according to an embodiment of the present invention.

FIG. 8 is a side view of a bogie. As shown in FIG. 8, the bogie has air spring 10, a bogie frame 81, an axle 82, and a wheel 83. Bogie frame 81 has a lateral beam 81a and a lateral beam 81b. Wheels 83 are attached to opposing ends of axle 82. Axle 82 is attached to bogie frame 81. More specifically, bogie frame 81 is attached to axles 82 as lateral beam 81a and lateral beam 81b are received and supported by axles 82 with axle springs (not shown) being interposed. Air spring 10 is an air spring according to each embodiment above. Air spring 10 is attached to bogie frame 81. More specifically, a side of laminated rubber 6 of air spring 10 is attached to bogie frame 81.

Though the embodiments of the present invention have been described as above, combination of features in each embodiment as appropriate is also originally intended. It should be understood that the embodiments disclosed herein are illustrative and non-restrictive in every respect. The scope of the present invention is defined by the terms of the claims and is intended to include any modifications within the scope and meaning equivalent to the terms of the claims.

REFERENCE SIGNS LIST 1 outer cylindrical member; 1a, 22a inner surface; 2 stopper assembly; 4 diaphragm; 5 lever; 6 laminated rubber; 7 handle; 8 bottom plate; 9 inner cylindrical member; 10 air spring; 11, 12, 13, 14 protrusion portion; 14a, 16a, 21a sidewall member; 14b, 16b, 21b cover plate; 15a, 15b, 15c internal chamber; 16 ring-shaped projection portion; 17 coupling portion; 18 flange portion; 19 welded portion; 20a, 20b, 20c, 20d, 20e, 20f, 20g, 20h boundary portion; 21 stopper portion; 22 base portion; 23 ring portion; 24 cover layer; 24a sidewall portion; 24b upper surface portion; 25 screw; 26 rubber seat; 27 internal space; 28 bolt; 29 ring guide; 30 screw hole; 81 bogie frame; 82 axle; and 83 wheel.

The invention claimed is:
1. An air spring comprising:
an outer cylindrical member;
an inner cylindrical member combined with the outer cylindrical member;
a diaphragm coupling the outer cylindrical member and the inner cylindrical member to each other, the diaphragm providing an internal space between the outer cylindrical member and the inner cylindrical member;
a first element located on a side of the internal space in at least one of the outer cylindrical member and the inner cylindrical member and defining a part of the internal space;
a second element adjacent to the first element, the second element defining a part of the internal space; and
a cover layer covering a boundary portion between the first element and the second element, wherein
at least one of the outer cylindrical member and the inner cylindrical member includes an inner surface located on the side of the internal space and a joint member joined to the inner surface,
the first element includes the inner surface,
the second element includes the joint member,
the boundary portion includes a joint portion between the joint member and the inner surface, and
the cover layer extends from the first element to the second element to cover the joint portion.

2. An air spring comprising:
an outer cylindrical member;
an inner cylindrical member combined with the outer cylindrical member;
a diaphragm coupling the outer cylindrical member and the inner cylindrical member to each other, the diaphragm providing an internal space between the outer cylindrical member and the inner cylindrical member;
a first element located on a side of the internal space in at least one of the outer cylindrical member and the inner cylindrical member and defining a part of the internal space;
a second element adjacent to the first element, the second element defining a part of the internal space; and
a cover layer covering a boundary portion between the first element and the second element, wherein
at least one of the outer cylindrical member and the inner cylindrical member includes an inner surface located on the side of the internal space and a protrusion portion joined to the inner surface and having an internal chamber,
the first element includes the inner surface,
the second element includes the protrusion portion,
the boundary portion includes a joint portion between the protrusion portion and the inner surface, and
the cover layer extends from the first element to the second element to cover the joint portion.

3. The air spring according to claim 2, wherein
the protrusion portion has a sidewall member joined to the inner surface and a cover plate joined to the sidewall member,
a plurality of the joint portions are provided,
the plurality of joint portions include a first joint portion between the sidewall member and the inner surface and a second joint portion between the sidewall member and the cover plate, and
the cover layer extends from the first joint portion to the second joint portion.

4. The air spring according to claim 3, wherein the cover layer located on the sidewall member is equal in thickness to or greater in thickness than the cover layer located on the cover plate.

5. The air spring according to claim 3, wherein the cover layer located on the cover plate is greater in thickness than the cover layer located on the sidewall member.

6. An air spring comprising:
an outer cylindrical member;
an inner cylindrical member combined with the outer cylindrical member;
a diaphragm coupling the outer cylindrical member and the inner cylindrical member to each other, the diaphragm providing an internal space between the outer cylindrical member and the inner cylindrical member;

a first element located on a side of the internal space in at least one of the outer cylindrical member and the inner cylindrical member and defining a part of the internal space;

a second element adjacent to the first element, the second element defining a part of the internal space; and a cover layer covering a boundary portion between the first element and the second element, wherein the outer cylindrical member has a reception portion joined to an inner surface of the outer cylindrical member and receiving one end of the diaphragm and a protrusion portion joined to the inner surface of the outer cylindrical member at a distance from the reception portion, the protrusion portion being capable of restricting displacement of the outer cylindrical member, the first element includes the inner surface of the outer cylindrical member, the second element includes the reception portion and the protrusion portion, and the cover layer extends from a joint portion between the reception portion and the inner surface of the outer cylindrical member to a joint portion between the inner surface of the outer cylindrical member and the protrusion portion.

7. The air spring according to claim 6, wherein the cover layer extends to a portion between the reception portion and one end of the diaphragm.

8. The air spring according to claim 1, wherein the joint portion includes a welded portion.

9. The air spring according to claim 1, wherein the cover layer includes a first portion having a first thickness on the boundary portion and a second portion having a second thickness smaller than the first thickness on a portion other than the boundary portion.

10. The air spring according to claim 1, wherein the cover layer is composed of at least one material selected from the group consisting of a resin, rubber, plastics, and elastomer.

11. The air spring according to claim 1, wherein the diaphragm and the cover layer are composed of materials different from each other.

12. The air spring according to claim 1, wherein the cover layer is different in mechanical characteristics from the diaphragm.

13. A bogie comprising the air spring according to claim 1.

* * * * *